March 28, 1939.  B. H. BENSON ET AL  2,152,131
PNEUMATIC TIRE
Filed Sept. 28, 1938
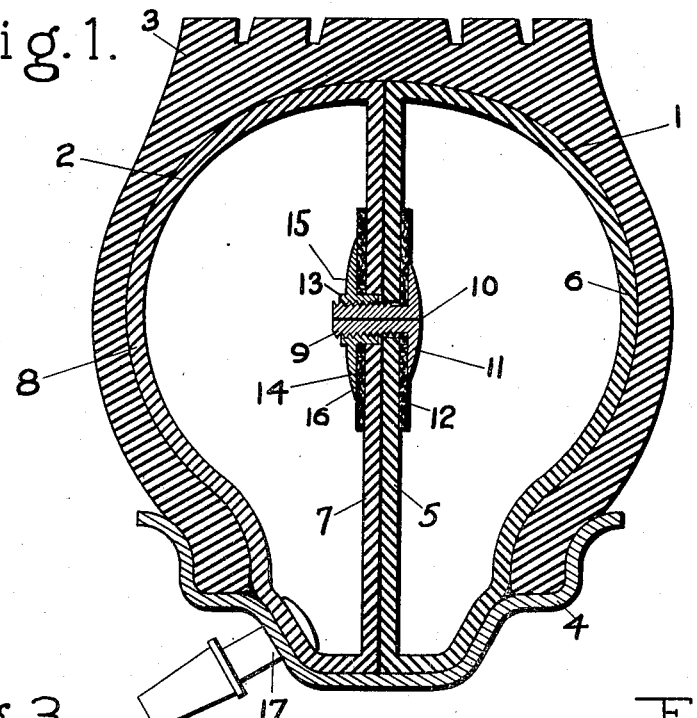
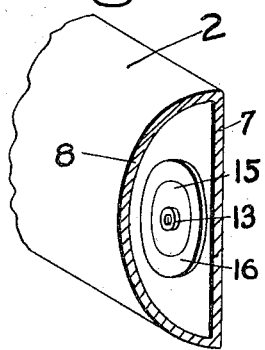
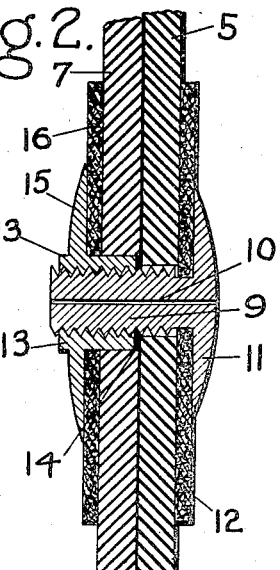
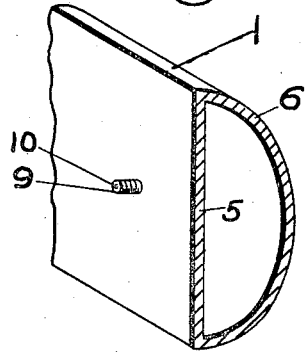
Inventors.
B. H. Benson
B. E. Mendelsohn
by Heard Smith & Tennant
Atty's Patented Mar. 28, 1939

2,152,131

UNITED STATES PATENT OFFICE 2,152,131

PNEUMATIC TIRE

Benjamin Howard Benson and Bernard E. Mendelsohn, Brookline, Mass.

Application September 28, 1938, Serial No. 232,125

3 Claims. (Cl. 152—341)

This invention relates to inner tubes for pneumatic tires and particularly to inner tubes of the twin-tube type.

One of the objects of the present invention is to provide a twin-tube inner tube which is so constructed that in case of a puncture or a blowout, there will be a gradual, as distinguished from a sudden, deflation of the tire, thus giving the driver of the car ample time to bring the car to rest before complete deflation takes place.

The sudden complete deflation of a tire while an automobile is traveling rapidly is a source of many accidents. In the case of an inner tube made in accordance with our invention, a puncture or a blowout merely results in a gradual deflation of the tire thus obviating conditions which are a source of danger.

An inner tube embodying our invention has two tube sections, each extending entirely around the tire, and the two tube sections are so connected together that there is a restricted or slow-leak duct forming a communication between the tube sections. This restricted duct or passage accomplishes two things: (1) It serves to maintain normally the same pressure in both tube sections, and (2) if either tube section becomes punctured or ruptured by a blowout, it serves to provide the safety feature of a gradual deflation of the other section.

We prefer to make each tube section substantially D-shape in cross-section, and the two tube sections are assembled with their flat faces in engagement with each other.

The flat wall of one tube section is provided with an outwardly-projecting stud having a restricted bore extending axially therethrough, and the flat wall of the other tube section is provided with a bushing member of a size to receive the stud and adapted to have the stud projected therethrough, said stud and bushing cooperating to secure the two tube sections together with their flat faces in contact.

In the illustrated embodiment of the invention, the stud is an exteriorly-screw-threaded stud and the bushing is in the form of a nut with which the stud has screw-threaded engagement. When the stud is thus screw-threaded into the nut, the stud and nut serve to clamp the two tube sections firmly together and the restricted bore through the stud forms an open restricted passage providing a communication between the tube sections.

In the accompanying drawing wherein we have illustrated a selected embodiment of our invention:

Fig. 1 is a transverse sectional view through a tire having an inner tube made in accordance with our invention;

Fig. 2 is an enlarged fragmentary sectional view illustrating the means for coupling the two tube sections together.

Fig. 3 is a fragmentary perspective sectional view showing one of the tube sections.

Fig. 4 is a similar view showing the other tube sections.

In the drawing, the twin-tube sections are indicated at 1 and 2 respectively. These two tube sections combined constitute the inner tube of the tire and are shown as located within a tire casing 3 which is mounted on a rim 4 as usual in pneumatic tires.

Each tube section is shown as having substantially a D shape in cross-section, that is, it is formed with a flat wall which has its edges connected by the semi-circular wall. The flat wall of the tube section 1 is indicated at 5 and the semi-circular wall at 6, while the flat wall of the tube section 2 is indicated at 7 and the semi-circular wall at 8.

The two tube sections 1 and 2 are assembled to make a complete inner tube assembly by bringing the flat walls 5 and 7 into mating relation and when thus assembled, the inner tube assembly is in the nature of an inner tube divided into two compartments by a diametrical partition comprising the two flat walls 5 and 7.

The tube sections 1 and 2 are so connected together that there is provided a constantly open but restricted duct or passage forming a communication between the two sections.

As illustrated in the drawing, the flat wall 5 of the tube section 1 has secured thereto and extending therethrough exteriorly-screw-threaded stud 9 which is provided with a restricted bore or duct 10 extending therethrough from one end to the other. This stud 9 is shown as having a flange or head 11 located on the inside of the wall 5, said stud extending through the wall 5 and projecting beyond the latter. 12 indicates a washer or patch of reinforcing material such as fabric and rubber, which patch or washer is secured to the inner face of the wall 5 and underlies the head 11 of the stud 9.

The flat wall 7 of the tube section 2 has a nut member 13 secured thereto which is adapted to have screw-threaded engagement with the projecting end of the stud 9. This nut 13 is secured to the wall 7 in any suitable way and the outer end 14 thereof preferably comes flush with the outer face of the wall 7. Said nut is also formed with a flange or collar 15 located on the inside of the wall 7, and preferably we will employ a reinforcing washer or patch 16 of fabric and rubber which is interposed between the flange 15 and the inner face of the wall 7.

Each of the tube sections is manufactured separately and in the same way that an ordinary inner tube would be except that the tube section 1 will have the stud 9 installed therein, while the tube section 2 will have the nut 13 mounted therein.

One of the tube sections, the tube section 2, as shown in the drawing, is also provided with the usual valve device 17 for inflating the inner tube.

Since each tube section has no interior partition, it can be made and vulcanized by the same method employed in making an ordinary inner tube. In making an inner tube, it is customary to partially inflate it during the vulcanizing process. When the tube section 1 is being made, it can be readily inflated through the duct 10 of the stud 9, said stud preferably being of such a size that it can be readily coupled to any inflating nozzle commonly used in inflating tires. When the tube section 1 has been sufficiently inflated for vulcanizing purposes, a cap may be screw-threaded to the end of the nipple to retain the air therein.

The tube section 2 may be inflated for vulcanizing purposes through the usual air valve 17. Before this can be done, however, it will be necessary to temporarily close the opening in the nut 13 by means of a suitable plug. After the two tube sections have been made then they are assembled by screwing the projecting end of the stud 9 into the nut 13 thereby clamping the two flat walls 5 and 7 tightly together.

It will be noted that the reinforcements 12 and 16 are located on the inner side of the tube sections and that the outer end 14 of the nut 13 comes flush with the outer face of the wall 7 of the tube section 2. When the nut 13 is screwed tightly to the stud 9, the outer faces of the walls 5 and 7 will be clamped flatly against each other since there are no protuberances on the outer faces of the walls which will prevent their coming into intimate contact.

After the two tube sections have thus been connected through the stud and nut, with their flat walls 5 and 7 in mating relation, then the contacting faces of these flat walls may be cemented together so as to provide a connection between the twin-tube sections throughout their extent.

When the inner tube is inflated to working pressure, there will exist the same pressure in each tube section, because of the fact that the tube sections have communication with each other through the constantly open but restricted duct 10. This duct, therefore, constitutes a means for equalizing the pressure in the two tube sections.

If a blowout occurs when the tire is in use, which ruptures one or the other of the tube sections, said tube section will, of course, be quickly deflated, but the pressure in the other tube section will hold the tire in a semi-inflated condition. The air in the tube section which is still intact will then gradually escape through the restricted duct 10, but this duct is so small that the intact tube section will be deflated very gradually, thus giving the driver of the car ample time to bring his car to rest before complete deflation takes place.

Hence our invention is in the nature of a safety device because in the case of a blow out, it obviates the danger which results from a sudden, complete deflation of the tire.

If the tire becomes punctured, the puncturing element will puncture one or the other of the tube sections. If the puncture is of such a nature that there is a rapid escape of air from the punctured tube, the air in the unpunctured tube section will still hold the tire up for a considerable time due to the fact that the air will escape very slowly through the duct 10 from the unpunctured tube section.

We claim:

1. An inner tube for a pneumatic tire comprising twin-tube sections having mating walls in contact with each other, an exteriorly-screw-threaded stud having a restricted bore therethrough extending through and projecting from the contacting wall of one tube section, and a nut member secured to the contacting wall of the other tube section and having a collar situated on the inside of said wall, said stud extending through the wall of said other tube section and having screw-threaded engagement with the nut, said restricted bore providing a constantly open slow-leak passage between said tube sections.

2. An inner tube for pneumatic tires comprising twin-tube sections having normally flat mating walls in contacting relation with each other, an exteriorly-screw-threaded stud having a restricted bore therethrough extending through and projecting from the contacting wall of one tube section, said stud having a head located within said tube section, a reinforcing member located between the head and the inner face of the flat wall of said tube section, a nut member secured to the contacting wall of the other tube section and screw-threaded to said stud, said nut having a collar situated on the inside of said wall, and a reinforcing member confined between said collar and the inner face of said wall, the outer end of said nut coming flush with the outer face of the wall, whereby the screwing of the nut to the stud clamps the flat faces tightly together, said restricted bore providing a constantly open slow-leak passage between the tube sections.

3. An inner tube for a pneumatic tire comprising twin-tube sections having mating walls in contact with each other, a stud having a restricted bore therethrough extending through and projecting from the contacting wall of one tube section, and a bushing member secured to the contacting wall of the other tube section and having a collar or flange situated on the inside of said wall, said stud extending through the wall of said other tube section and through the bushing and being united thereto, said restricted bore providing a constantly open slow-leak passage between the tube sections.

BENJAMIN HOWARD BENSON.
BERNARD E. MENDELSOHN.